United States Patent Office 3,133,790
Patented May 19, 1964

3,133,790
PRODUCTION OF HYDROXYL AMMONIUM SALTS
Kurt Jockers, Ludwigshafen (Rhine), Germany, assignor to Badische Anilin- & Soda-Fabrik Aktiengesellschaft, Ludwigshafen (Rhine), Germany
No Drawing. Filed July 25, 1961, Ser. No. 126,499
Claims priority, application Germany Aug. 4, 1960
6 Claims. (Cl. 23—50)

This invention relates to a process for the production of hydroxylammonium salts. More particularly, the invention relates to improvements in a process for the catalytic production of hydroxylammonium salts from nitric oxide and hydrogen.

It is known that hydroxylammonium salts may be prepared by reducing nitric oxide with hydrogen in the presence of a platinum catalyst and a dilute mineral acid. This process is carried out by gassing a suspension of the platinum-containing catalyst in the presence of a dilute mineral acid with a mixture of nitric oxide and hydrogen, separating the resultant aqueous solution of the hydroxylammonium salt from the said catalyst suspension when the acid is almost used up, adding to the catalyst fresh dilute mineral acid and gassing the resulting suspension again with a mixture of nitric oxide and hydrogen. Mineral acids which are suitable for this process include hydrochloric acid, phosphoric acid and sulfuric acid.

In respect of this process, a number of proposals for improvement have become known. Thus it is known that by adding small amounts of organic substances, as for example aliphatic alcohols, acids, ketones and the like, the space-time yields can be considerably improved, that the life of the platinum catalysts in the production of hydroxylammonium sulfate can be considerably increased by using sulfuric acid which has previously been subjected to an oxidizing treatment, and that, besides pure platinum catalysts or carrier catalysts with platinum as the active substance, it is also possible to use catalysts with a platinum alloy as the active substance. In order to counter side reactions which proceed simultaneously in the hydrogenation of nitric oxide to hydroxylamine and by which part of the nitric oxide used is hydrogenated to ammonia, it has been proposed to use partly poisoned catalysts and in this way to increase considerably the yield of hydroxylamine. Another proposal which has become known relates to the use of specially prepared catalysts which are characterized by a prolonged life and increased activity.

It is an object of the present invention to provide a more economical and efficient method of producing hydroxyl-ammonium salts. A special object of the present invention is to provide a new method for prolonging the life and the activity of platinum-containing catalysts as used in the production of hydroxylammonium salts.

I have made the surprising discovery that the activity of the catalyst, measured in grams of nitric oxide converted per gram of platinum per hour, can be increased by treating said catalyst suspension, after displacing at least partly the gas mixture of nitric oxide and hydrogen above said suspension with a gas selected from the group consisting of nitrogen, carbon dioxide and nitric oxide, at any stage of the process with nitric oxide in such a way that the supernatant gas mixture contains, after any residual htydrogen has been used up by reaction with nitric oxide, an amount of at least 10% by volume of nitric oxide. Mixtures of nitric oxide and an inert gas, such as nitrogen or carbon dioxide, which contain at least 10 vol. percent of nitric oxide, may also be used. In batchwise operation, this periodic treatment with nitric oxide is advantageously carried out at the beginning or at the end of an operation. When the process is carried out continuously, it is advantageous to gas either that part of the catalyst which is withdrawn from the system together with the hydroxylammonium salt formed or that part which is introduced into the system together with fresh acid.

The catalyst may however also be gassed at any other stage of the process, for example when the acid contained in the system has only partly been reacted. It is advantageous to carry out the gas treatment every 2 to 12 hours.

In accordance with my invention, the gassing, i.e., the treatment of the catalyst with nitric oxide or a mixture of nitric oxide and an inert gas is advantageously carried out by introducing the nitric oxide or the mixture of inert gas and nitric oxide into the catalyst suspension, if desired with stirring. For this purpose, the nitric oxide/hydrogen mixture above the suspension is previously substantially displaced by means of pure nitric oxide, or the said gas mixture is substantially displaced by flusing with an inert gas, such as nitrogen or carbon dioxide, and the catalyst suspension then treated with nitric oxide or a mixture of nitric oxide and an inert gas. The nitric oxide should be used in such an amount that it is contained in the gas space above the catalyst suspension in a concentration of at least 10 vol. percent. Introduction of the gas is continued until consumption of nitric oxide in the gas space by reaction with residual hydrogen or dissolution in the suspension has come to a standstill, i.e., until the pressure in the gas space above the suspension remains constant when the supply of gas is stopped. In an agitated vessel having a capacity of 4 m.³ of suspension, for example, introduction of gas may be discontinued after 5 minutes.

After separation of the catalyst treated with nitric oxide from the hydroxylammonium salt solution and mixing of the catalyst with fresh acid, the nitric oxide above the suspension is displaced with hydrogen and the reaction with a nitric oxide/hydrogen mixture resumed.

The temperatures applied during gassing may be varied within wide limits, for example from the freezing point of the suspension up to temperatures of 80° C. It is preferred to apply the temperature at which the reaction of nitric oxide with hydrogen is carried out.

By the treatment according to my invention there is achieved a higher activity of the catalyst as well as an increase in the life of the catalyst.

Gassing with nitric oxide is easy to carry out and requires no expenditure of apparatus. The economic significance of this measure resides in the fact that, with the same yield of hydroxylamine with reference to the amount of hydrogen and nitric oxide introduced, the production capacity of a given plant is increased with simultaneous lowering of the costs for regeneration of the catalyst.

The invention is illustrated by, but not limited to, the following examples.

EXAMPLE 1

A 7 m.³ agitated vessel is charged with 4 m.³ of 20% sulfuric acid and 40 kilograms of a 1% platinum-on-graphite catalyst. After displacing the air with nitrogen, a mixture of nitric oxide and hydrogen in the volumetric ratio 1:2 is introduced at a temperature of 45° C. while stirring. After the acid has been used up, the catalyst is filtered off with complete exclusion of air, again mixed with 4 m.³ of acid and again gassed with the mixture of nitric oxide and hydrogen. The activity of the catalyst is measured at each charge. Table 1 contains the results of these measurements.

EXAMPLE 2

In the same way as in Example 1, the agitated vessel is charged with 4 m.³ of 20% sulfuric acid and 40 kilograms of the same graphite-supported platinum catalyst. While maintaining a temperature of 45° C., a mixture of nitric oxide and hydrogen is introduced after expelling the air. After the acid has been used up, the mixture of nitric oxide and hydrogen above the suspension is expelled with nitric oxide so that the gas space contains about 20% by volume of hydrogen and 70% by volume of nitric oxide, the remainder being nitrogen. The suspension is then stirred until the pressure remains constant. Then the catalyst is filtered off with complete exclusion of air, mixed with 4 m.³ of acid and, after expelling the nitric oxide with hydrogen, again gassed with the mixture of nitric oxide and hydrogen. The activity of the catalyst is measured for every batch. The values obtained are given in Table 1.

Table 1

| Number of charge | Activity (grams NO per gram Pt per hour) | |
|---|---|---|
| | Example 1 | Example 2 |
| 1 | 58.3 | 58.0 |
| 2 | 60.2 | 60.9 |
| 3 | 59.5 | 62.3 |
| 4 | 58.6 | 64.2 |
| 5 | 57.9 | 64.1 |
| 6 | 57.1 | 64.5 |
| 7 | 56.7 | 64.7 |
| 8 | 56.5 | 64.0 |
| 9 | 56.6 | 64.6 |
| 10 | 56.2 | 64.5 |
| 15 | 55.6 | 64.1 |
| 20 | 55.8 | 63.8 |
| 30 | 54.9 | 63.8 |
| 40 | 55.1 | 63.3 |
| 50 | 53.8 | 62.7 |
| 60 | 53.6 | 62.5 |
| 80 | 53.3 | 61.3 |
| 100 | 52.9 | 61.0 |

Similar results are obtained by using for example dilute hydrochloric acid rather than 20% sulfuric acid. Also, the nitric oxide/hydrogen mixture above the suspension may be displaced with carbon dioxide or nitrogen rather than with nitric oxide and the suspension then treated with nitric oxide. The amount of nitric oxide should be such that the concentration of nitric oxide in the gas space above the suspension is at least 10 vol. percent after the gassing.

The table shows that the activity of the catalyst is more constant and is higher by a not inconsiderable amount when it is periodically treated with nitric oxide.

Although only a platinum-on-graphite catalyst is mentioned in the foregoing examples, platinum catalysts of various types known in the art may be used, for instance, platinum or charcoal, metallic platinum itself, platinized platinum, platinized platinum on silicagel or platinum on any of the known acid-resistant catalyst carriers.

EXAMPLE 3

In an agitated vessel, the catalyst is gassed in the manner described in Example 2 with pure nitric oxide each time before the catalyst suspension is filtered. After forty charges, the catalyst is filtered off without previous gassing with nitric oxide. The results of this experiment are shown in Table 2 with reference to the activity of the catalyst used. Comparison of Table 2 with the values in Table 1 shows the rapid drop in the activity of the catalyst when the periodic gassing with nitric oxide is discontinued.

Table 2

| Number of charge | | Activity in grams of NO per gram of Pt per hour |
|---|---|---|
| 1 | Catalyst gassed each time with nitric oxide. | 57.8 |
| 5 | | 63.9 |
| 10 | | 64.7 |
| 15 | | 64.3 |
| 20 | | 64.6 |
| 25 | | 63.4 |
| 30 | | 63.0 |
| 35 | | 63.2 |
| 40 | | 63.6 |
| 41 | No gassing of the catalyst. | 63.2 |
| 42 | | 61.4 |
| 43 | | 61.5 |
| 44 | | 59.2 |
| 45 | | 58.6 |
| 46 | | 58.1 |
| 47 | | 56.9 |
| 48 | | 57.4 |
| 49 | | 56.5 |
| 50 | | 55.3 |
| 60 | | 54.1 |

What I claim is:

1. In a process for the production of a hydroxylammonium salt by catalytic hydrogenation of nitric oxide in an aqueous solution of a strong mineral acid wherein a platinum catalyst is suspended in a solution consisting essentially of water and a strong mineral acid, a mixture of hydrogen and nitric oxide is introduced into the suspension to form said hydroxylammonium salt, the resultant solution of the hydroxylammonium salt is separated from said catalyst, and the catalyst is then suspended in a fresh solution consisting essentially of water and a strong mineral acid with repeated introduction of hydrogen and nitric oxide to form additional hydroxylammonium salt, the improvement for prolonging the activity of the catalyst which comprises: repeatedly treating the catalyst suspension at any stage of the process with nitric oxide, after first at least partly displacing the gas mixture of nitric oxide and hydrogen with at least one gas selected from the group consisting of nitrogen, carbon dioxide and nitric oxide, said repeated treatment of the catalyst suspension with nitric oxide being carried out such that the supernatant gas mixture contains an amount of at least 10% by volume of nitric oxide after any residual hydrogen has been used up by reaction with nitric oxide.

2. A process as claimed in claim 1, wherein said repeated treatment is carried out while said catalyst is suspended in a substantially acid-free hydroxyammonium salt solution.

3. A process as claimed in claim 1, wherein said repeated treatment is carried out while said catalyst is suspended in a solution consisting essentially of water and a strong mineral acid.

4. A process as claimed in claim 1 wherein the nitric oxide for the repeated treatment of the catalyst suspension is diluted with an inert gas.

5. A process as claimed in claim 4 wherein the inert gas is nitrogen.

6. A process as claimed in claim 4 wherein the inert gas is carbon dioxide.

References Cited in the file of this patent

UNITED STATES PATENTS 2,628,888   Benson _____ Feb. 17, 1953
2,628,889   Benson _____ Feb. 17, 1953

UNITED STATES PATENT OFFICE
CERTIFICATE OF CORRECTION

Patent No. 3,133,790                                      May 19, 1964

Kurt Jockers

It is hereby certified that error appears in the above numbered patent requiring correction and that the said Letters Patent should read as corrected below.

Column 1, line 64, for "htydrogen" read -- hydrogen --; column 3, Table 1, under the heading "Example 2", eighth line thereof, for "64.0" read -- 65.0 --.

Signed and sealed this 10th day of November 1964.

(SEAL)
Attest:

ERNEST W. SWIDER                              EDWARD J. BRENNER
Attesting Officer                                 Commissioner of Patents